US008635238B2

(12) United States Patent
Tisi et al.

(10) Patent No.: US 8,635,238 B2
(45) Date of Patent: Jan. 21, 2014

(54) APPRATUS, SYSTEM AND METHOD FOR AN AUTOMATED STOCK LEDGER

(75) Inventors: Arthur Tisi, Amawalk, NY (US); Kevin McDonnell, Warwick, NY (US); Oleg Margolin, Stamford, CT (US); Oleg Alshansky, Brooklyn, NY (US)

(73) Assignee: Fairway Group Acquisition Company, New York, NY (US)

( * ) Notice: Subject to any disclaimer, the term of this patent is extended or adjusted under 35 U.S.C. 154(b) by 126 days.

(21) Appl. No.: 12/685,130

(22) Filed: Jan. 11, 2010

(65) Prior Publication Data
US 2010/0268616 A1 Oct. 21, 2010

Related U.S. Application Data

(60) Provisional application No. 61/170,789, filed on Apr. 20, 2009.

(51) Int. Cl.
*G06F 17/30* (2006.01)

(52) U.S. Cl.
CPC ... *G06F 17/30286* (2013.01); *Y10S 707/99942* (2013.01)
USPC ........................ 707/762; 705/22; 707/999.101

(58) Field of Classification Search
CPC ................................................ G06F 17/30286
USPC ........ 705/22, 26, 27, 30, 8; 707/762, 999.101
See application file for complete search history.

(56) References Cited

U.S. PATENT DOCUMENTS

| 7,013,290 | B2 * | 3/2006 | Ananian ........................ 705/27 |
| 7,039,645 | B1 * | 5/2006 | Neal et al. .............. 707/999.101 |
| 2003/0208392 | A1 * | 11/2003 | Shekar et al. .................... 705/8 |
| 2004/0100380 | A1 * | 5/2004 | Lindsay et al. ............... 340/540 |
| 2005/0050076 | A1 * | 3/2005 | Tong et al. .................... 707/100 |
| 2005/0075900 | A1 * | 4/2005 | Arguimbau, III ............... 705/10 |
| 2007/0019561 | A1 * | 1/2007 | Peterson ...................... 370/252 |
| 2007/0168209 | A1 * | 7/2007 | Shah ................................. 705/1 |
| 2009/0271300 | A1 * | 10/2009 | Mundy ............................ 705/30 |

* cited by examiner

*Primary Examiner* — Ryan Zeender
*Assistant Examiner* — Hunter Wilder
(74) *Attorney, Agent, or Firm* — The Law Offices of Anthony L. Merola (57) ABSTRACT

An inventory stock ledger system, apparatus and method including a process by which one can track inventory efficiently, but can also utilize to perform inventory analysis on a dynamic level. The method includes recording inventory snapshots across various dimensions of a retail business and tracking the inventory levels for select products in to provide real time reports. Central to the apparatus is the idea that inventory can be viewed from a central starting point, and then examined among various dimensions. Inventory management is readily modified and dynamic. The method includes a build capability for examining the inventory levels and snapshots of inventory for a retail market franchise.

8 Claims, 7 Drawing Sheets

APPRATUS, SYSTEM AND METHOD FOR AN AUTOMATED STOCK LEDGER

CROSS-REFERENCE TO RELATED APPLICATIONS

This application relates to co-invented and U.S. Provisional Patent Application No. 61/170,789, entitled, "AN APPARATUS, SYSTEM AND METHOD FOR MANAGING RETAIL SALES INFORMATION", filed Apr. 20, 2009; which application is hereby incorporated by reference in its entirety.

BACKGROUND OF THE INVENTION

The present invention relates generally to an apparatus, system and method for an automated stock ledger.

In large scale conventional food markets, food products are typically ordered from numerous general distributors and then sold to the consumers through multiple outlets stores. In such environments, because the supply chain includes multiple delivery and storage points before the consumer has access to produce and prepared foods, there is usually a lag time between picking of the produce and preparation of the food. This of course reduces food quality, shelf life and ultimately, the taste.

The current trend is to prepare food products and sell such prepared food products directly to the consumer at the market location close to the consumer on a daily basis. In this regard, conventional markets have attempted to create homemade food products by making such products locally at the store, using local produce growers and then presenting the products to the consumers for sale on a daily basis. However, rarely are such large scale conventional markets organized and efficient enough to create such freshly made food products on a large scale in order to maximize profits. As a result, such large scale conventional markets having fresh made foods tend to include a limited selection and bandwidth.

There are some enterprises that specialize in the homemade food market environment. These enterprises tend to be small in comparison to conventional food markets as well as geographically limited. Such attributes provide enterprises with the ability to cater to local consumers with homemade food on a relatively large scale in the local market space. However the homemade nature of this market creates an inherent problem. Namely, the speed with which the produce is picked or the food is prepared and then presented to the consumer for purchase is of paramount importance. As such, transfers from the creation facility to the department location and to the point of sale need to be tracked for accurate accounting of the product. As success builds upon the homemade nature and high quality food products additional stores are typically added.

Such expansion naturally exacerbates product and supply stream issues. In the rapid production and sale environment inherent with daily homemade food production a problem with tracking and accounting for thousands of products becomes exponentially more difficult to overcome. The problem is compounded as the number of stores increases as well as the number of products sold. Moreover, a market based on producing and selling prepared food products on a daily basis typically includes multiple internal facilities such as a central kitchen, bakery, cheese making facility, produce assembly facility, butcher facility, forward buy facility, and the consumer markets locations.

With the daily volume of products purchased, food products prepared and then sold to the consumer, such markets must also account for the internal movement of goods and products. Accounting for transfers, including warehouse transfers, store to store transfers and departmental transfers has historically been a paper intensive exercise. For example, produce arriving from a local grower may leave the assembly facility to arrive in a kitchen department to prepare foods requiring such produce. All receipts and transfers of the produce must be accounted for in the produce department, the kitchen department as well as the accounting office. Furthermore, such transfers need to be accounted for when the prepared food product is sold to the consumer so reports can be generated to determine margin for such sales of the prepared food. In this way, a market in the homemade food market can track all products purchased, all foods prepared and ultimately sold all while managing the flow of information on a daily business in order to maximize profits.

Typically a market employee will manually check off documents listing such products upon removal from one area of the market and then manually check a receiving document upon arrival at another area of the market. Such low-tech systems for maintaining internal records are highly inefficient. In addition, other employees are required to manually review the transfer documents to account for products, which is a time intensive activity. In general, inventory management has typically been linear and monitoring reports have been static. Competitor analysis has found that such low-tech systems can provide robust reporting, however the reporting process is inefficient and largely static. Inventory review on a real time basis is almost impossible.

In this connection a stock ledger solution having the ability account for products transferring in and out of a business, as well as for tracking the movement of such products between internal departments, is therefore needed.

Such a stock ledger solution having the ability to quickly and efficiently identify and account for deviations in purchase orders and received products is also desired.

Such a stock ledger solution having the ability to maintain accounting integrity from the creation of the product, to the internal transfer of the product and finally to the sale thereof in a rapidly moving system of a homemade food product facility is further desired.

A method to analyze and track inventory changes with build-on capabilities to expand data analysis is also needed. Such a mechanism having the ability to track inventory efficiently and perform data analysis on a dynamic level also needed. Such a method providing the ability to provide inventory data snapshots and inventory levels is further needed.

Such a process that provides the ability to view inventory from a central starting point, and examined among various data point dimensions is further needed.

Such a system will be able to ascertain data from multiple legacy systems and efficiently provide reports to users to garner real time inventory tracking across multiple dimensions.

SUMMARY OF THE INVENTION

The present invention includes a system and method for reviewing retail sales, inventory and margin information from a business macro perspective to a specific item level.

Examining inventory at different times is critical to efficient inventory management. Taking inventory snapshots allows one to examine inventories with predefined views. Such views allow comparison across different snapshots to provide a cohesive framework for analysis. Snapshots are setup and customized by the end user. In this manner, snapshots are customized to create views that are best suited to the user's environment.

Inventory moves across physical locations and time. By tracking these inventory levels and using them as a dimension to analyze inventory, one can conduct a robust assessment on the characteristics of the inventory dynamism.

Inventory can be viewed on several dimensions, aside from the typical time and location dimensions advantageously allowing greater granularity, dynamism, and robustness of analysis.

Example analysis also includes searching inventory for perishable items across the entire company. An alternative example includes searching daily changes across products.

In a first aspect, the present invention includes a method for ascertaining product inventory information across a legacy computer system having multiple distant data point locations, where the method includes creating a database template, creating a data model, creating processes to load a database system, collecting relevant data, extracting product information from an operational database, for example a purchasing database, transferring extracted product information to a stock ledger platform, determining an original location and a destination location for the product information, loading the product information into a destination data location, storing the product information data in a sequel server, and reporting the product information to a user in order aggregate the product information date over multiple time periods.

In some embodiments the present invention includes creating a report of product inventory based upon a preselected product over a selected time period at a particular location. In some embodiments the present invention includes providing multiple reports of the selected product over multiple locations and time frames.

In a second aspect, the present invention includes a computer apparatus having storage media with program code stored thereon, where the program code is executable in a distributed computing environment and having instructions for creating a database template, creating a data model, creating processes to load database system, collecting relevant data, extracting product information from an operational database, transferring extracted product information to a stock ledger platform, determining an original location and a destination location for the product information, loading the product information into a the destination data location, storing the product information data in a sequel server and reporting the product information to a user in order aggregate the product information date over multiple time periods.

In a third aspect, the present invention includes a system for implementing a dynamic inventory stock ledger process in a distributed computing environment, including a computing memory in at least a first computer, the first computer comprising program code for creating a database template, creating a data model, creating processes to load a database system, collecting a relevant data set, extracting product information from an operational database, and transferring the extracted product information to a stock ledger platform with a means for determining an original location and a destination location for the product information, and a computing memory in at least a second computer, the second computer comprising program code for loading the product information into a destination data location, storing the product information data in a sequel server, and including a means for reporting the product information to a user in order aggregate the product information date over multiple time periods.

A searching inventory algorithm is included in some embodiments of the present invention where positive incremental inventory search equals the goods available for sale, minus the sales, shrink and markdowns. A physical inventory adjustment can be made to the goods available for sale resulting in an ending inventory for any search period selected. Since the present invention can manage inventory information over several dimensions, analysis results of the inventory away from the flat, static report are more accurate. The present invention advantageously allows for build-on capability that can be utilized with little effort once the stock ledger uploaded and operating.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

The present disclosure will now be described more fully with reference to the Figures in which embodiments of the present disclosure are shown. The subject matter of this disclosure may, however, be embodied in many different forms and should not be construed as being limited to the embodiments set forth herein.

The present invention advantageously allows inventory to be managed over several dimensions away from the flat, static report. The present invention also allows for a build-on capability that can be utilized with little additional networks assets added to the process currently in place. In general, inventory moves across multiple physical locations at any given time. By tracking the inventory levels and using them as a dimension to analyze inventory, one can conduct a robust assessment on the characteristics of the inventory dynamics.

Inventory can be viewed on several dimensions, aside from the typical time and location dimensions. Doing such allows greater granularity, dynamism, and robustness of analysis. Such dimensions for review can be categorized as follows:

Product; category, type, sales, delivered, moved, price, margin;

Location: Store, Department, Company; and

Time: Daily, Weekly, Monthly, Quarterly, Yearly;

An example analysis can be looking at inventory for perishable items across the entire company. An alternative example would be looking at daily changes across products.

A mechanism for reviewing the inventory dated can be best explained with a formula for review: Starting inventory+Incremental inventory=Goods available for sale−Sales−Shrink−Markdowns−Physical Inventory Adjustment=Ending Inventory.

It is with this formula for inventory review that the present invention has been contemplated.

Exemplary Operating Environment

Figure 1:
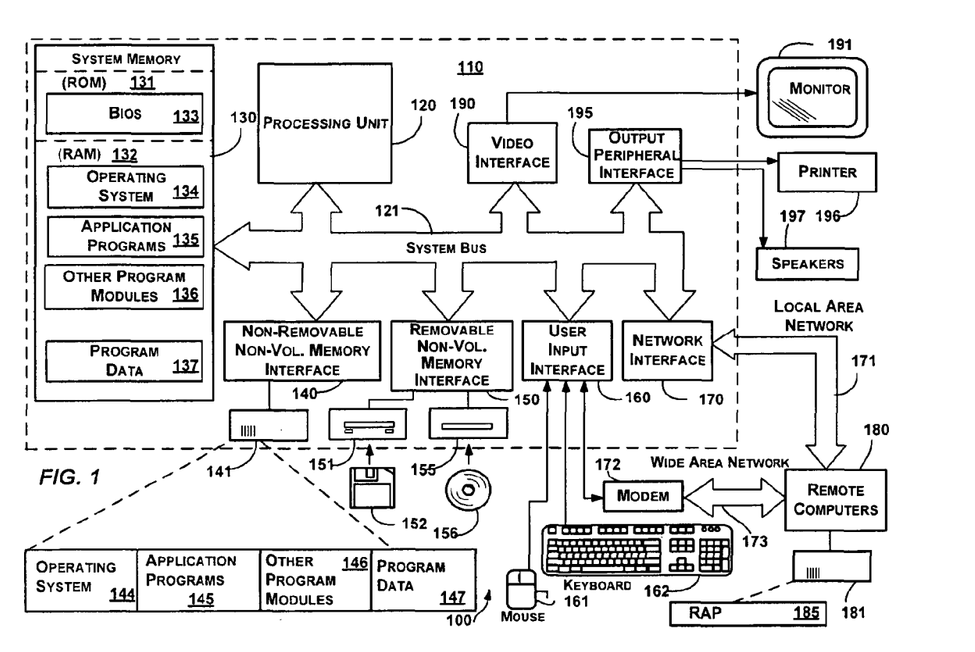
FIG. 1 is a block diagram showing an exemplary computing environment in which aspects of the present invention may be implemented.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
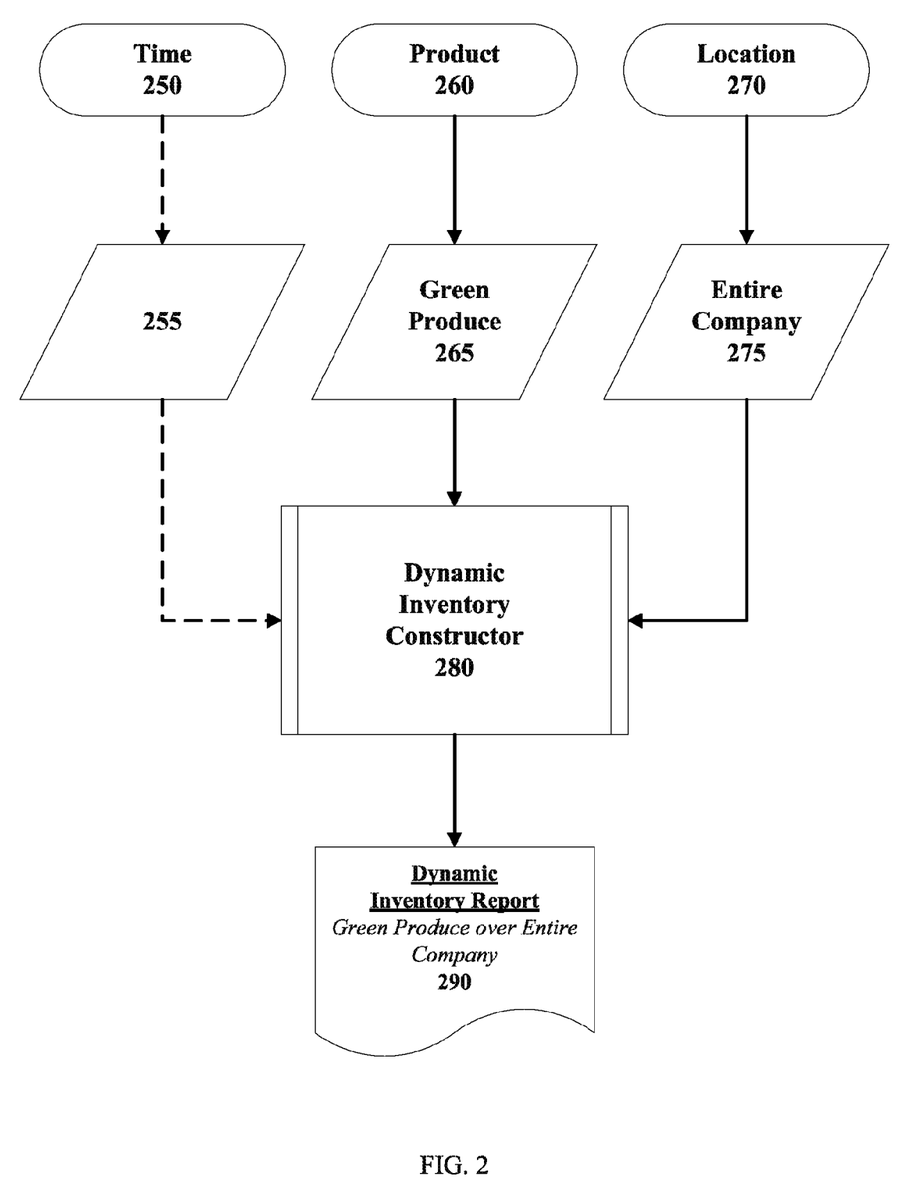
FIG. 2 is a flow diagram of an exemplary inventory dimension according to one embodiment of the present invention.

FIG. 2 shows a data flow diagram in connection with inventory movement analysis. Inventory is analyzed across multiple dimensions including time 250, product 260 and location 270. A snapshot of the inventory analysis can be accomplished at a specific point in time 255, for a particular product 265, e.g. "green produce", at a particular location 275, e.g. "entire company". The dynamic inventory constructor 280 receives information from multiple data repositories of the company (See FIGS. 3 and 4) to create the dynamic inventory report 290. In this example, the inventory of green produce is analyzed for the entire company at a specific time.

Figure 3:
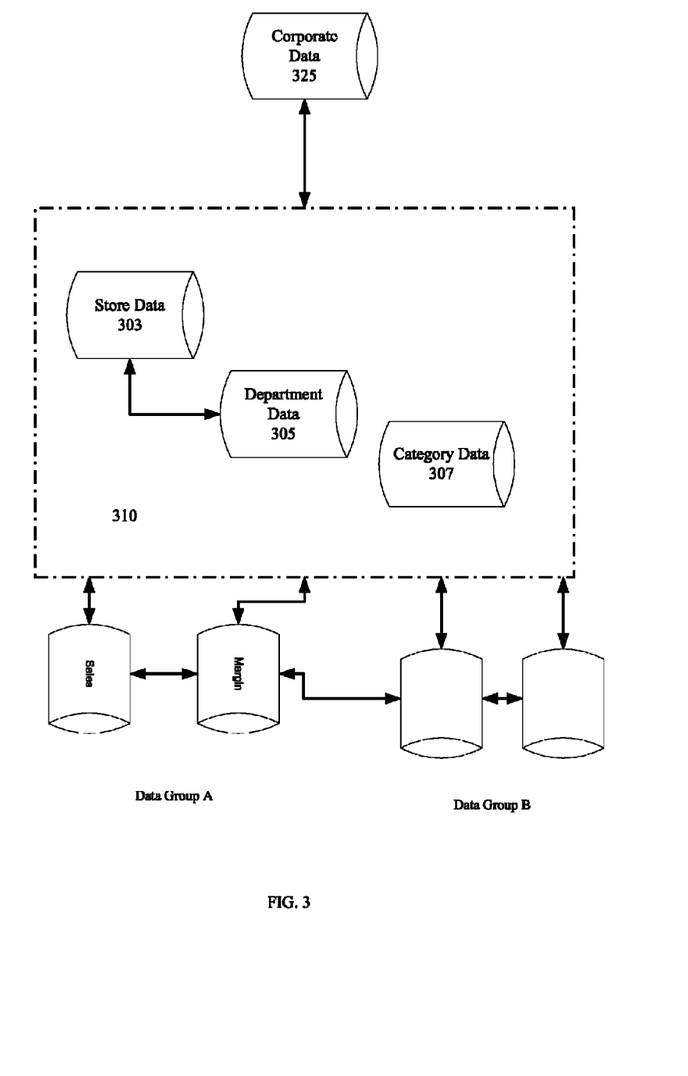
FIG. 3 is a block diagram showing an exemplary data structure according to one embodiment of the present invention.

FIG. 3 shows a block diagram having an exemplary data structure according to one embodiment of the present invention. Individual location data 310 can include store data 303, department data 305 and category data 307. All data servers are preferably interconnected with a corporate level data server 325. Each server may include multiple sets of data known as data Group A and Data Group B. Each of the data groups include sales information and margin information where Group A includes such data for a time T and Group B includes such information for a T Plus X. X can be any amount of time different from Time T so that inventory analysis can be conducted at any point in time and referenced from any point in time in order to create the dynamic inventory reports 290.

Figure 4:
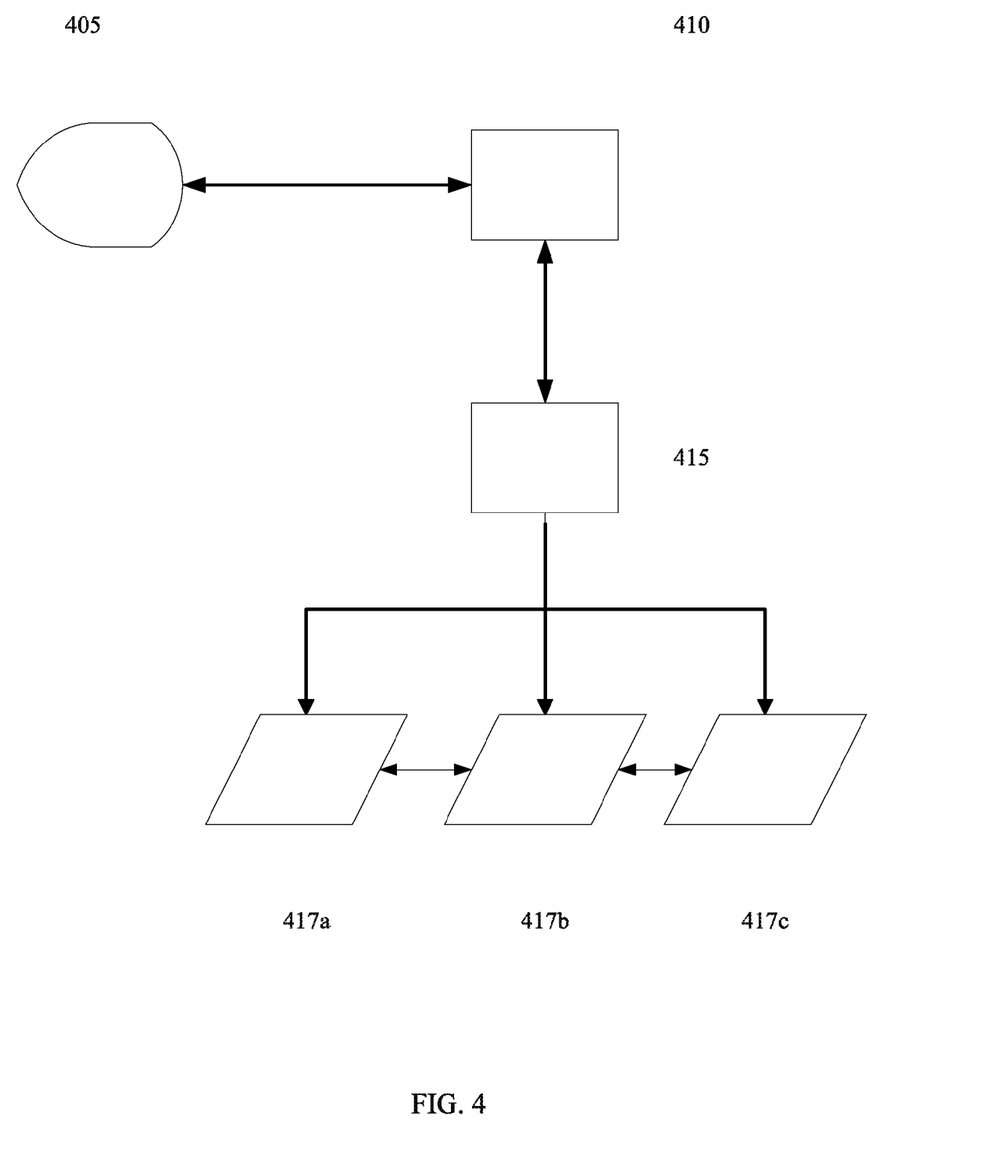
FIG. 4 is a data flow diagram according to one embodiment of the present invention.

FIG. 4 shows a data flow diagram according to one embodiment of the present invention. Exemplary location data server 410 can be connected to a terminal 405 where a user can conduct inventory snapshot research at any point time in connection with the dynamic inventory reports 290. Server 415 includes reports 417a, b and c.

Figure 5:
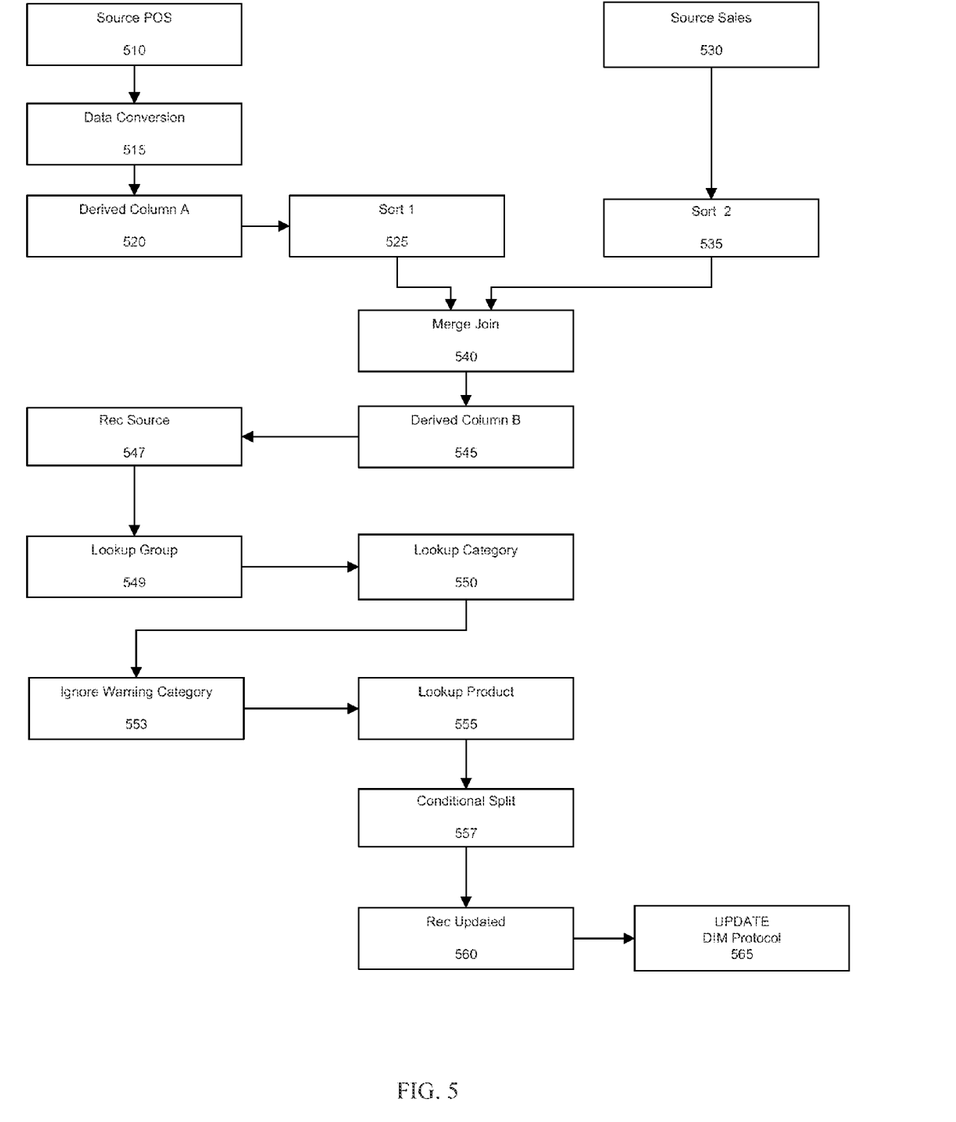
FIG. 5 is a data flow diagram in connection with a group category search feature according one embodiment of the present invention.

FIG. 5 shows a data flow diagram in connection with a group category search feature according one embodiment of the present invention. Source POS 510 is a point of sale source where legacy data is retrieved from. Typically, fragmented companies have multiple systems where the POS databases are not standardized. POS 510 can include a group of databases that maintain data in several different forms. Preferably the system uses an ETL or exchange transfer language in order to normalize the data across all legacy systems. Source sales 530 is typically a newer system designed to have data formatted in a preferred manner taken from standard registries. Data conversion 515 allows the data from POS 510 to be formatted into a desirable form where Derived Column A at step 520 provides specific coloumnized data reports to be generated for a selected business ontology. Sort functions 525 and 535 allow the data to be further categorized into a specific format.

Internal uniform product codes ("UPC") are typically different as compared to standard IBM POS machines, hence a required merge function. Merge Join process 540 is a complex process performed on POS and IBM sales data in order to reach a standardized data set. Derived Column B in step 545 provides for a merged, formalized and formatted set of data. In steps 547 through 550 the entire universe of UPC's are categorized in standard groups and categories. Rec Source 547 allows the source data to be recorded and Lookup Group process 549 provides a process step to review the data based on a group heading. In Process 550 the data is reviewed based on a Lookup Category.

Warning Category process 553 provides a clean set of data of unexpected data corrections based upon a master file in local corporate database. Lookup Product process 555 provides for data review based upon the particular product. After 555 the data is normalized in a conditional split 557 schema into data cubes in multiple dimensions. All categories are then maintained, all UPC are updated and all exceptions put aside such as items deleted from master file in the Rec Updated Process 560. A Dimension Protocol process 565 allows the update of the various protocol dimensions such as store category, time or item and then such information is released to the general system architecture.

Figure 6:
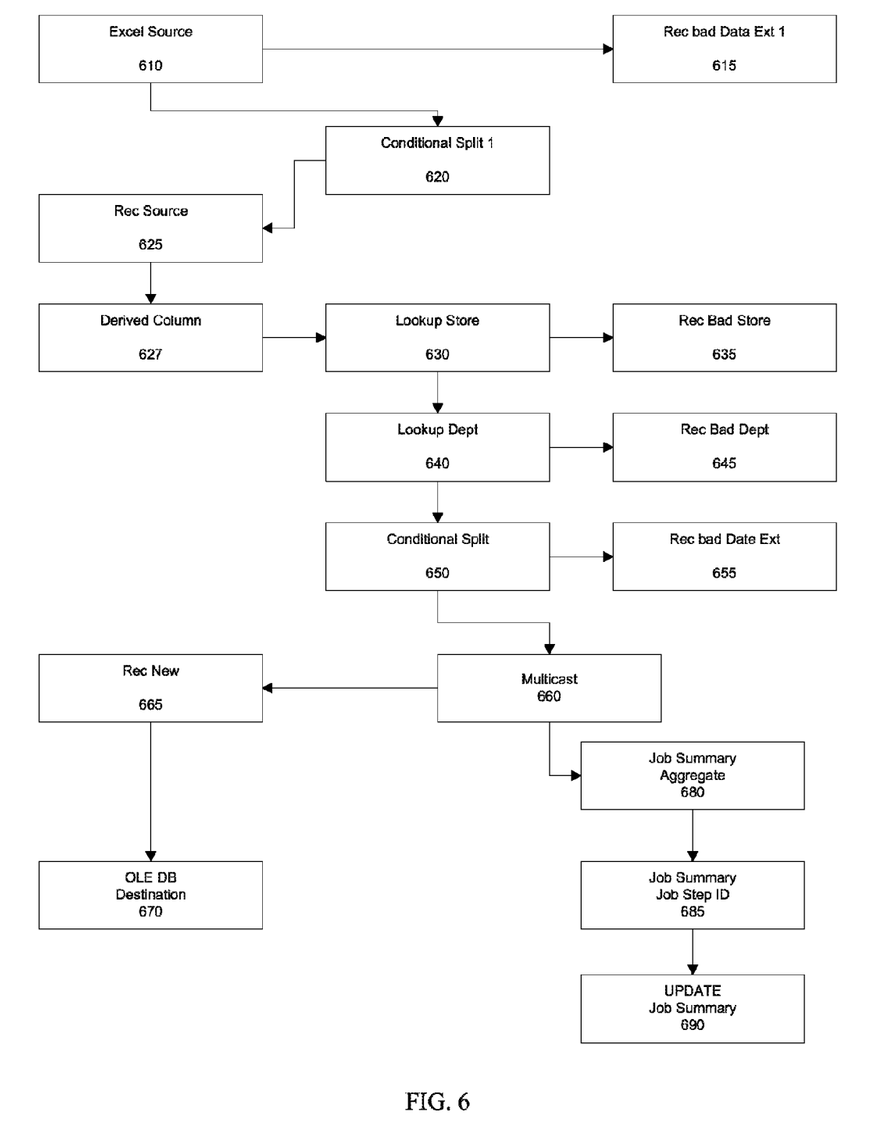
FIG. 6 is a data flow diagram in connection with a store to store inventory category search according to one embodiment of the present invention.

FIG. 6 is a data flow diagram in connection with a store to store inventory category search according to one embodiment of the present invention. By default, the user will typically know the format of an Excel source 610 as it is likely preselected for the organization. However, there may be some bad data which gets recorded by the process of Rec Bad Data Ext 1 at step 615. An example of bad data includes files that are older than the review cycle. Unfortunately, legacy systems typically include integrity issues. Since inventory review is a comparison of balance sheet accounts, the relational database review is an inventory search based on only one perspective of the data review. The present invention allows for a stock ledger to show beginning inventory and ending inventory, and every step in between during the review period. The review period is typically one week starting 12 am Monday to 11:59 Sunday.

Further, in between two physical inventories there may be shrink, where Known shrink=damage and Unknown Shrink=theft+loss. The real time inventory is a moving target due to purchases, sales and internal transfers. Typically there will be one set of master product data attributes for all products across system. These data files need to be modified and updated periodically in order to provide accounting integrity across all datasets. An example of a required updated occurs when a written record does not correspond with the electronic record. In the field, for example, truck receivers sometime make mistakes on written received records. Down the line review of the fields can compound the error throughout the system. Such data is put aside in step 615 for reconciliation later on in the process. Additionally, costs are not typically in a purchase order as well as broker fees, transportation costs and other human error or willful conduct. All adjustments by the end of the week are accounted for at week's end.

A Conditional Split process in step 620 allows normalization of an excel source data and a Rec Source process 625 allows for storing of the data in the reconciliation process. The Derived Column process 627 formats the data into a preselected format for review. The Lookup Store process 630 and the Lookup Department process 640 provides for review of the data on multiple dimensions.

A Rec Bad Department process 645 and a Rec bad Store process 635 allows for recordation of discrepancies in the data set. A Conditional Split process 650 allows identification and recognition of formatting changes as compared to the source file as well as new and old data. The Rec Bad Date Ext 655 process records the discrepancies.

Conditional split 650 feeds into a Multicast step 660. Multicast is a technique for one-to-many communication over an Interne Protocol infrastructure in a network. It scales to a larger receiver population by not requiring prior knowledge of whom or how many receivers there are. Multicast uses network infrastructure efficiently by requiring the source to send a packet only once, even if it needs to be delivered to a large number of receivers. The nodes in the network take care of replicating the packet to reach multiple receivers only when necessary. The most common low-level protocol to use multicast addressing is User Datagram Protocol (UDP). By its nature, UDP is not reliable—messages may be lost or delivered out of order. Reliable multicast protocols such as Pragmatic General Multicast (PGM) have been developed to add loss detection and retransmission on top of the multicast process.

All new data is recorded in the Rec New 665 based on the preselected relational schema and stored in an OLE Database Destination 670 for future retrieval.

Scheduled research and review jobs are updated during the Job Summary Aggregate process 680, Job Summary Job Step ID 685 and Update Job Summary 690.

Figure 7:
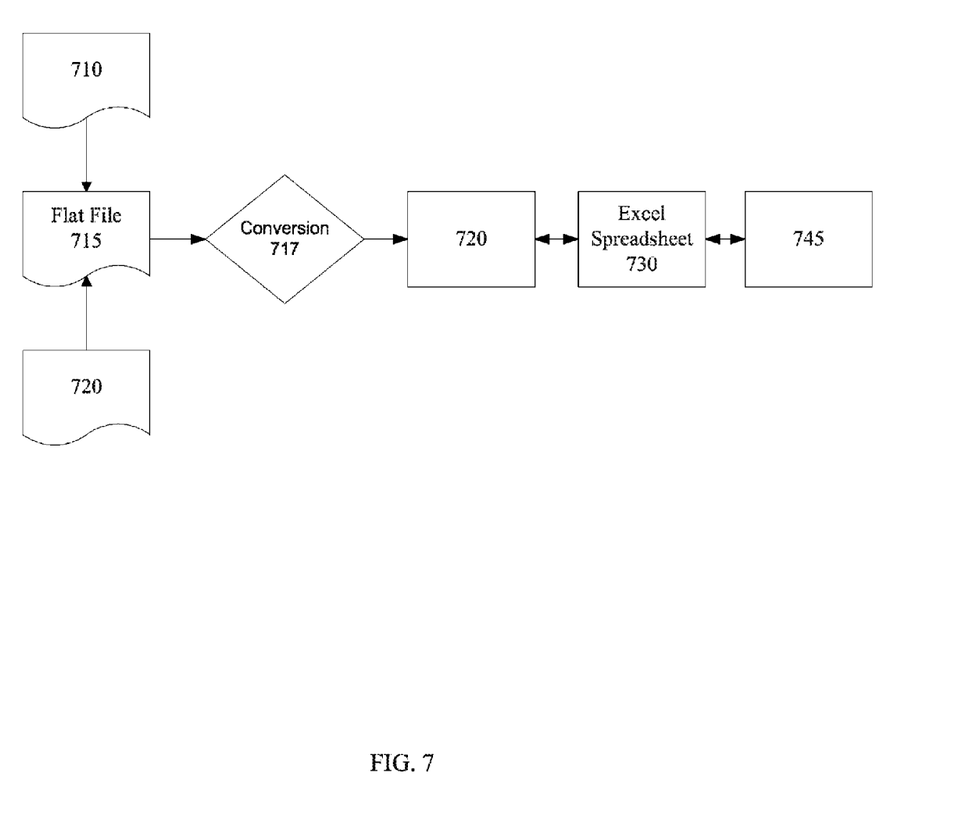
FIG. 7 is a flow diagram showing the assembly of flat files into spreadsheet files according to one embodiment of the present invention.

FIG. 7 is a flow diagram showing the assembly of flat files into spreadsheet files according to one embodiment of the invention. Flat files 710, 715 and 720 are typically arranged in a vertical data set. A Conversion Process 717 converts the data within the flat files to viewable spreadsheets 720, 730 and 745 for the various group required reports, such as accounting, receivables and tax related reports. In this way the data can be organized and stored in an efficient manner for database architecture and recalled with speed and efficiency into a form readily viewable by various groups with the organization.

It will be apparent to one of skill in the art that described herein is a novel system and method for an automatic stock ledger process. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

The invention claimed is:

1. An apparatus having a computer readable storage medium on which is embedded one or more computer programs, the one or more computer programs implementing a method of maintaining an electronic stock ledger for a grocery store having a legacy computer system, the legacy computer system having multiple distant operational databases, the one or more computer programs comprising a set of instructions for:
creating an electronic interface using the legacy computer system;
creating an electronic data model using the legacy computer system;
creating at least one process rule using the legacy computer system;
selecting a product type and a type of product information regarding the selected product type to extract from the operational databases having at least one of sales information, inventory information and margin information;
extracting product information regarding the selected product type and the selected type of product information from at least one of the operational databases;
determining an original location within the at least one of the operational databases from which the extracted product information was extracted;
determining a destination location within the central database which the extracted product information will be loaded;
loading the extracted product information into the central database at the destination data location, using the electronic interface created at the legacy computer system;
recording a new data set with the extracted product information using the data model and the at least one process rule created at the legacy computer system; and
enhancing the new data set with the extracted product information in a master file set of data in the central database.

2. The apparatus according to claim 1, where the one or more computer programs further comprises a set of instructions for creating a report of product inventory based upon the selected product type over a selected time period.

3. The apparatus according to claim 1, where the one or more computer programs further comprises a set of instructions for creating a report of product inventory based on a location of the product.

4. The apparatus according to claim 1, where the one or more computer programs further comprises a set of instructions for providing multiple reports of the selected product type over multiple product locations and time frames.

5. The apparatus according to claim 1, where the one or more computer programs further comprises a set of instructions for collecting data from at least one POS data location and one known format source data location.

6. The apparatus according to claim 5, where the one or more computer programs further comprises a set of instructions for performing a multicast process to aggregate job summary information.

7. The apparatus according to claim 6, where the one or more computer programs further comprises a set of instructions for performing a bad data step to store discrepancies in the POS data and the known formatted source data as compared to the master file set of data.

8. The apparatus according to claim 7, where the one or more computer programs further comprises a set of instructions for performing a conditional split process on the collected data.

\* \* \* \* \*